Figure 1:
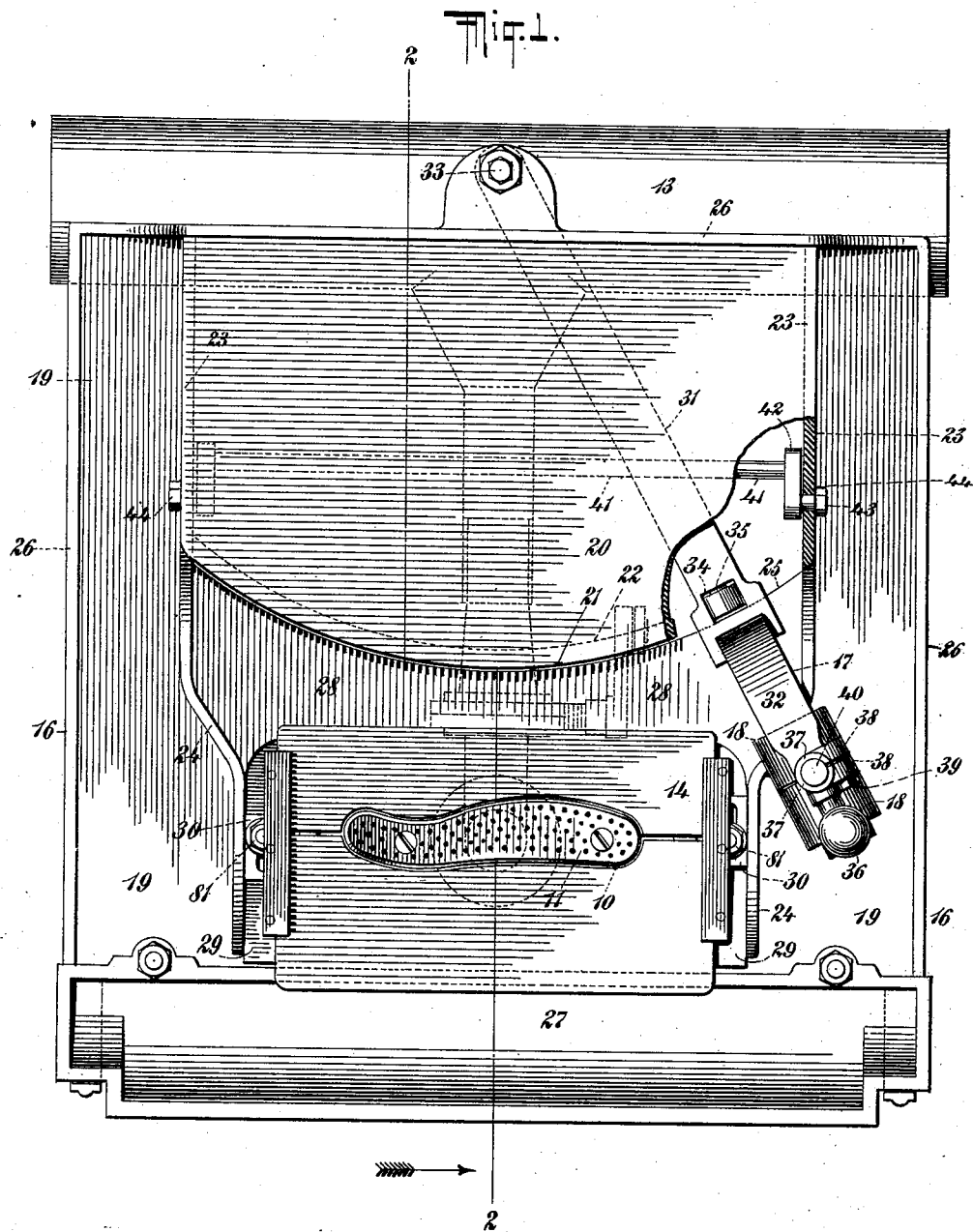

No. 688,276. Patented Dec. 3, 1901.
J. R. WILLIAMS.
COMBINED CIGAR WRAPPER CUTTER AND ROLLING TABLE.
(Application filed Oct. 3, 1901.)
(No Model.) 2 Sheets—Sheet 1.

WITNESSES:
Gustave Dieterich
John Kehlenbeck

INVENTOR
John R. Williams
BY
Chas. C. Gill
ATTORNEY

No. 688,276. Patented Dec. 3, 1901.
J. R. WILLIAMS.
COMBINED CIGAR WRAPPER CUTTER AND ROLLING TABLE.
(Application filed Oct. 3, 1901.)
(No Model.) 2 Sheets—Sheet 2.
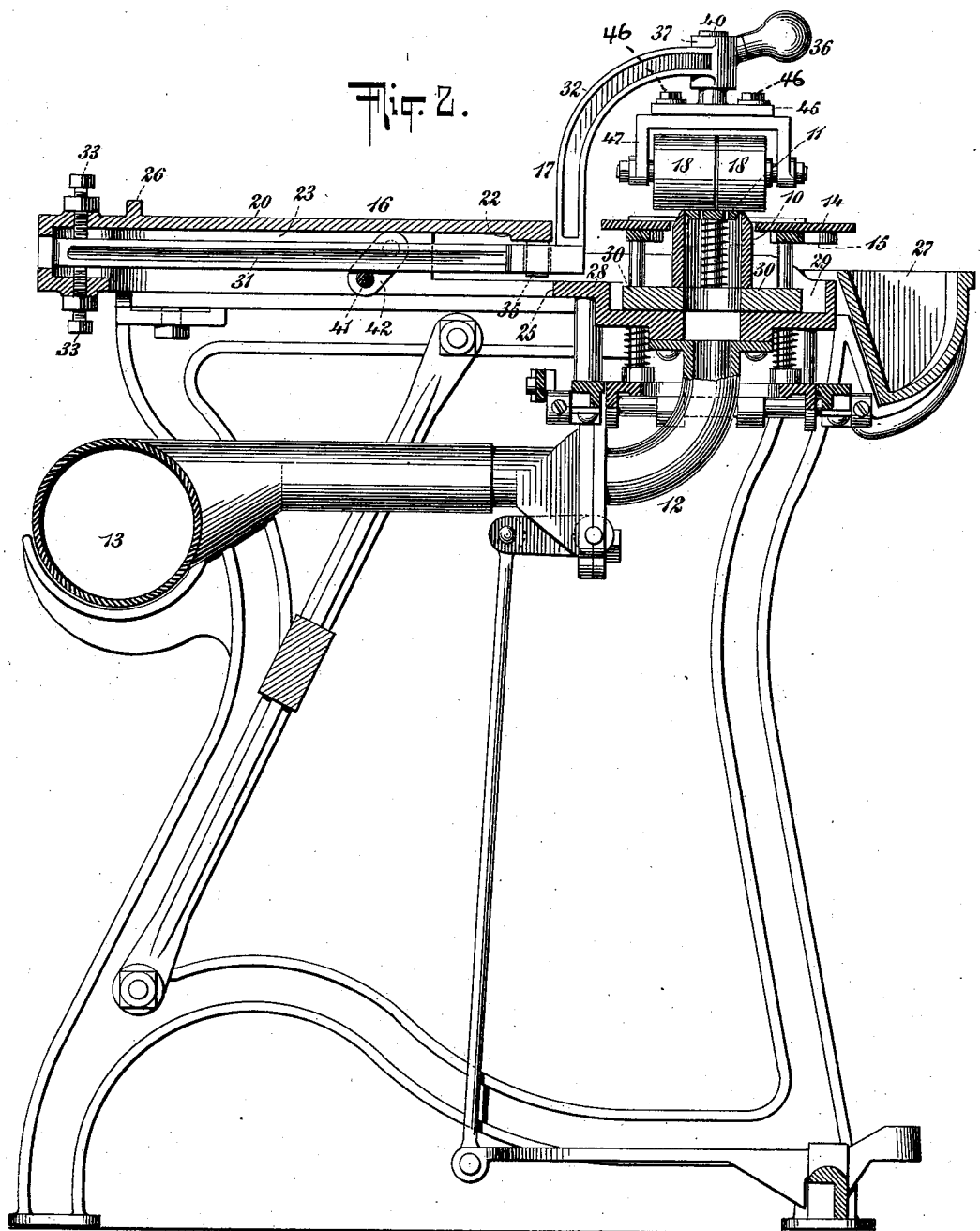
WITNESSES:
Gustave Dieterich.
John Kehlenbeck.
INVENTOR
John R. Williams
BY
Chas. C. Gill
ATTORNEY

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y., A CORPORATION OF NEW YORK.

COMBINED CIGAR-WRAPPER CUTTER AND ROLLING-TABLE.

SPECIFICATION forming part of Letters Patent No. 688,276, dated December 3, 1901.

Original application filed April 17, 1901, Serial No. 56,200. Divided and this application filed October 3, 1901. Serial No. 77,378. (No model.)

*To all whom it may concern:*

Be it known that I, JOHN R. WILLIAMS, a citizen of the United States, and a resident of East Orange, in the county of Essex and State of New Jersey, have invented certain new and useful Improvements in a Combined Cigar-Wrapper Cutter and Rolling-Table, of which the following is a specification.

The present application is a division of the application of JOHN R. WILLIAMS, filed April 17, 1901, Serial No. 56,200, for Letters Patent for improvements in combined cigar-wrapper cutters and rolling-tables.

The invention relates to improvements in combined cigar-wrapper cutters and rolling-tables, and pertains more especially to improvements in the character of machine described in Letters Patent of the United States No. 400,153, granted March 26, 1889, to JOHN R. WILLIAMS for improvements in machines for cutting out cigar wrappers or binders.

The present invention has for its object to improve and render more efficient and desirable the machine shown and described in the said Letters Patent No. 400,153; and the said invention has relation more especially to the construction of the top bed-plate and roller-arm of the machine, as hereinafter pointed out.

The invention will be fully understood from the detailed description hereinafter presented, reference being had to the accompanying drawings, in which—

Figure 1 is a top view, partly broken away, of a combined wrapper-cutter and rolling-table constructed in accordance with and embodying the invention; and Fig. 2 is a vertical section of same on the dotted line 2 2 of Fig. 1.

It will be observed upon a comparison of the machine shown in the present drawings with the drawings of the aforesaid Patent No. 400,153 that many of the features of the present construction are substantially identical with the construction shown in said patent, and it will not be necessary, therefore, to refer in detail to all of the features of the present machine, since the novel features made the subject of this application are confined to the top bed-plate and the roller-arm. Some of the features present alike in the accompanying drawings and in the aforesaid Patent No. 400,153 will, however, be briefly referred to.

In the drawings, 10 designates a wrapper-cutting die containing a perforated platen 11 within its upper cutting edges and having its interior chamber connected by a pipe 12 with a horizontal pipe 13, the latter being connected, as usual, with a suction-blower (not shown) for creating suction within the space below the perforated platen 11, whereby the tobacco-leaf may be held upon the die 10 and platen 11 by air-suction during the operation of cutting a wrapper from the leaf, the wrapper being subsequently held upon said platen by air-suction during the operation of rolling said wrapper around the filler to form the cigar. Surrounding the cutting-die 10 is ordinarily provided a rolling-table 14, preferably made in two parts, as shown, one part being at each side of the die 10. The rolling-table 14 is, as fully set forth in the aforesaid Patent No. 400,153, preferably mounted upon a frame 15, which is vertically movable, whereby during the cutting of the wrapper from the leaf the table 14 may be allowed to remain in its lower position, (shown in Fig. 2,) and then preparatory to the rolling of the cigar said table may be elevated, so that its upper surface shall be on a level with the upper edges of the die 10 and with the perforated platen 11 form an extended surface for the convenience of the operator in rolling the cigars. The table 14 and frame 15 may be raised and lowered by any suitable means; but I recommend for this purpose the employment of the mechanism shown in said Patent No. 400,153, which is substantially duplicated in the present machine. The die 10, perforated plate 11, air-pipe 12, rolling-table 14, and frame 15, referred to above, are not in themselves claimed in the present application, since said parts do not vary in any special particular from the like parts of the machine shown in said Patent No. 400,153.

The top bed-plate of the machine is designated as a whole by the numeral 16, the roller-arm by the numeral 17, and the rollers for cooperating with the die 10 by the numeral 18, and these features numbered 16 and 17, with their necessary coöperative parts, alone constitute the subject of the present application.

The top bed-plate 16 is mounted, as usual, upon side supporting legs or frames, and said top bed-plate comprises the table portion 19 and the table portion 20, the table portion 20 being centrally disposed at the rear part of the bed-plate 16 and being on a higher elevation than the table portion 19. The front edge of the table portion 20 is curved, as at 21, and below this curved front edge of the table portion 20 is formed the tramway 22, (indicated by dotted lines in Fig. 1,) said tramway 22 extending from end to end of the lower surface of the front edge of said table portion 20. The elevated table portion 20 has vertical sides 23, which are extended forward toward the front edge of the bed-plate by the convergent vertical flanges 24, which rise from the lower table portion 19, which between the rear ends of the flanges 24 terminates in a curved edge 25. There is an open space between the front curved edge 21 of the upper table portion 20 and the curved rear edge 25 of the lower table portion 19, and in this space the roller-arm 17 moves pivotally when actuated.

The sides and rear end of the bed-plate 16 are encompassed by the vertical flange 26, which serves to retain the scraps of tobacco upon the bed-plate. At the front end of the bed-plate 16 is provided a suitable trough 27 to receive tobacco-leaves and which trough is of known construction and not claimed herein. The flanges 24 are about the same height as the flange 26, and hence the table portion 19 between the flanges 24 and the flange 26 is adapted to retain the tobacco which may be placed or fall thereupon, said flanges preventing the tobacco from falling over the side edges of the bed-plate or passing inward to that portion of the table 19 lettered 28 and disposed at the rear of the cutting-die 10 and between the flanges 24, it being my purpose to keep the portion 28 of the bed-plate substantially clear of tobacco or refuse. Between the front portions of the flanges 24 is formed in the bed-plate a depression or recess 29, within which the plate 30, carrying the die 10, is secured in a well-known manner, said plate 30 being preferably secured, as indicated in Fig. 1, by bolts 81, passing downward through elongated slots formed in the ends of said plate. The depression or elongated recess 29 forms a receptacle to receive the plate 30 and permits the lower table portion 19 to serve the convenience of the operator and to avoid having the front portion of the roller-arm 17 extended upward to an undue or inconvenient extent. The front portions of the flanges 24 are at the opposite ends of the elongated recess or depression 29 and prevent scraps of tobacco from passing into said recess.

The roller-arm 17 comprises a horizontal member 31 and a front member 32, the latter rising from the front end of the horizontal member 31 and then extending forwardly, as shown in Figs. 1 and 2. The rear end of the roller-arm 17 is centered, so as to have a free horizontal action upon the pivot-screws 33 33, whence the horizontal member 31 of said roller-arm extends below the elevated table portion 20 and at its front end projects slightly forward of the curved edge 25 of the portion 28 of the bed-plate. The horizontal member 31 of the roller-arm 17 has in its front portion the vertical aperture 34, in which a roller 35 is journaled, said roller being adapted to engage and travel along the tramway 22, which is directly over said roller and at the under side of the front portion of the elevated table part 20. The front end of the horizontal member 31 of the roller-arm 17 only projects a slight distance forward of the front edge of the table portion 20, and from this forwardly-projecting front end of the horizontal member 31 arises the member 32 of said roller-arm, said member 32 extending vertically and then turning forwardly and being provided at its front extremity with a handle 36, by which the arm 17 may be manually operated. The front member 32 of the roller-arm 17 is formed with the vertical split sleeve 37, whose portions have formed with them the lugs 38 38, adapted to receive the clamping-screw 39, by which the said sleeve 37 may be tightened against the vertical standard 40, by which the rollers 18 are suspended from the front end of the roller-arm 17 in position to be moved over the cutting edges of the die 10 for the purpose of severing a wrapper from the tobacco-leaf to be placed over said die. The sleeve 37 and lugs 38 are cast with the roller-arm 17; but there is sufficient yield in the metal to enable the clamping-screw 39 to tighten the sleeve 37 on the standard 40.

The horizontal member 31 of the roller-arm 17 rides upon a transverse rod 41, which is secured in the lower ends of the arms 42, the upper ends of said arms 42 being secured by bolts 43 and nuts 44 to the inner vertical surface of the sides 23, supporting the table portion 20. The bolts 43 serve as pivots upon which the arms 42 and rod 41 may be swung, and the nuts 44 when tightened against the sides 23 serve to fasten the arms 42 and rod 41 in any position to which said parts may be adjusted. It is desired that the rod 41 shall serve as a support for the horizontal member of the roller-arm 17 without unduly binding against said member, and hence the rod 41 is secured by means which permit of its adjustment toward or from the horizontal member 31 of the roller-arm, whereby said rod may be caused to press against the said horizontal member 31 with as much or as little force as required. When the rod 41 is moved into proper relation to the member 31, the nuts 44 will be tightened against the sides 23, so that said rod 41 may thereafter remain in rigid position.

The horizontal member 31 of the roller-arm 17 is kept from springing upward, especially while the rollers 18 are traveling over the die 10, by reason of the tramway 22 being at the upper side of the roller 35, and this is an important feature of the construction, since with the form of the roller-arm shown in the aforesaid patent, No. 400,153, it was customary for the operator when the rollers were passing over the tobacco-leaf on the die to pull downward on the front end of the roller-arm, so as to create sufficient pressure to cut the wrapper from the leaf, the downward force exerted by the operator becoming necessary in some cases, because of the tendency of the roller-arm to yield slightly upward when meeting the increased thickness of material over the cutting-die. With the present construction of roller-arm the said arm is prevented from springing upward at any time, and especially while the rollers 18 are traveling over the die 10, by reason of the fact that the roller-arm possesses the horizontal member 31, traveling below the elevated table portion 20, and that the front part of the table portion 20 constitutes a tramway against which the roller 35 of the arm 17 may travel. With the use of the roller-arm 17 and tramway 22 the operator does not have to press downward on the front end of the roller-arm when the rollers 18 are traveling over the die 10, it being only necessary with the present construction that the operator move the roller-arm so as to carry the rollers 18 longitudinally over the die 10. The transverse rod 41, supporting the member 31 of the roller-arm 17, is also of importance, because it prevents any sagging downward of the front portion of the roller-arm 17, and said rod 41 and tramway 22 at the opposite sides of the roller-arm serve to define a space within which the roller-arm is confined and guided and positively held against springing upward or sagging downward.

The standard 40 is a plain cylindrical stem adapted to be secured within the sleeve 37, provided at the front end of the roller-arm 17, and said standard 40 has at its lower end a base-plate 45, to which is secured, by means of the bolts 46, the roller-frame 47, which carries the rollers 18, the latter being of any usual or suitable form and construction and not being separately claimed herein.

From the foregoing description and in view of the well-known condition of the art to which the invention pertains the operation of the machine made the subject of this application will be readily understood without further detailed explanation.

What I claim as my invention, and desire to secure by Letters Patent, is—

1. The die in the outline of the wrapper to be cut, and the bed-frame supporting and extending to the rear of said die, combined with the roller-arm pivoted at its rear end and concealed throughout a substantial portion of its length below a part of said bed-frame, the tramway above and for the said roller-arm, the roller-frame suspended from the exposed front end of said roller-arm, and the rollers carried by said roller-frame for coöperation with said die; substantially as set forth.

2. The die (10) in the outline of the wrapper to be cut, the bed-frame supporting and extending to the rear of said die and having the elevated table portion 20 below the front edge of which is formed the elongated opening extending transversely of the bed-frame, the lower surface of the said portion 20 constituting the curved tramway 22, combined with the transverse supporting-rod 41 below said portion 20, the pivoted roller-arm 17 comprising the members 31, 32, the member 31 being below said portion 20 and intermediate and adapted to engage said supporting-rod 41 and tramway 22, and the member 32 extending upward and frontward from said member 31, the roller-frame suspended from the front end of the said roller-arm, and the rollers 18 carried by said suspended frame and adapted for coöperation with the said die; substantially as set forth.

3. The die in the outline of the wrapper to be cut, the bed-frame supporting and extending to the rear of said die, the curved tramway 22, and the supporting-rod 41 on a lower plane than said tramway, combined with the pivoted roller-arm 17 comprising the members 31, 32, the member 31 being below said tramway 22 and above said rod 41 and adapted to engage both said tramway and said rod, and the member 32 extending upward and frontward from the member 31, the roller-frame suspended from the front end of the said roller-arm, and the rollers 18 carried by said roller-frame and adapted to coöperate with the said die; substantially as set forth.

4. The die in the outline of the wrapper to be cut, and the bed-frame supporting and extending to the rear of said die, combined with the roller-arm pivoted at its rear end, a rigid tramway above and for said arm and adapted to prevent said arm from springing upward during the operation of cutting the wrappers, the roller-frame suspended from the exposed front end of said roller-arm, and the rollers carried by said roller-frame for coöperation with said die; substantially as set forth.

5. The die in the outline of the wrapper to be cut, the bed-frame supporting and extending to the rear of said die, and the pivoted roller-arm comprising the members 31, 32, the member 31 being below and substantially entirely concealed by said bed-frame, and the member 32 extending upward and frontward from the front end of the said member 31, combined with the tramway above and for said member 31, the supporting-rod 41 below and for said member 31, a roller 35 carried by the roller-arm to engage said tramway, the roller-frame suspended from the front end of the said roller-arm, and rollers 18 carried by said roller-frame for coöperation with the said die; substantially as set forth.

6. The die in the outline of the wrapper to be cut, the bed-frame supporting and extending to the rear of said die, and the pivoted roller-arm 17 comprising the members 31, 32, the member 31 being below and substantially concealed by said bed-frame and the member 32 extending upward and forward from the front end of the member 31, the tramway 22 above and for said member 31, the supporting-rod 41 below and for said member 31, the arms 42 carrying said rod 41, the nuts and screws 43, 44, for securing and adjusting said rod 41 in its relation to said member 31, the roller-frame suspended from the front end of said roller-arm, and the rollers carried by said roller-frame for coöperation with the said die; substantially as set forth.

7. The die in the outline of the wrapper to be cut, and the top bed-frame supporting and extending to the rear of said die and having the depression or recess 29 to receive the die structure, the elevated portion 20 at the rear of said recess 29, and the flanges 24 extending frontward from the sides of the said elevated portion 20 and along the opposite end portions of said recess 29, combined with the roller-arm 17 comprising the members 31, 32, the member 31 being below said elevated portion 20 and extending slightly forward of the front edge thereof, and the member 32 extending upward and forward from the front end of the said member 31, the roller-frame suspended from the front end of said roller-arm, and the rollers carried by said frame and adapted for coöperation with said die; substantially as set forth.

8. The die in the outline of the wrapper to be cut, and the bed-frame supporting and extending to the rear of said die, combined with the roller-arm pivoted at its rear end and concealed throughout a substantial portion of its length below a part of the said bed-frame, the tramway above and for the said roller-arm, the supporting-rod below and for said roller-arm, the roller-frame suspended from the exposed front end of the said roller-arm, and the rollers carried by said roller-frame for coöperation with said die; substantially as set forth.

Signed at New York, in the county of New York and State of New York, this 2d day of October, A. D. 1901.

JOHN R. WILLIAMS.

Witnesses:
   CHAS. C. GILL,
   GUNDER GUNDERSON.